United States Patent [19]

Stewart

[11] 4,214,810
[45] Jul. 29, 1980

[54] METHOD OF CONNECTING OPTICAL FIBRES

[75] Inventor: William J. Stewart, Fritwell, England

[73] Assignee: Plessey Handel und Investments AG, Zug, Switzerland

[21] Appl. No.: 873,884

[22] Filed: Jan. 31, 1978

[30] Foreign Application Priority Data

Feb. 1, 1977 [GB] United Kingdom ............... 3983/77

[51] Int. Cl.³ ............................................. G02B 5/14
[52] U.S. Cl. ................................. 350/96.21; 350/320
[58] Field of Search ............. 350/96.15, 96.20, 96.21, 350/96.22, 320

[56] References Cited

U.S. PATENT DOCUMENTS

| | | | |
|---|---|---|---|
| 3,860,405 | 1/1975 | Coucoulas et al. | 350/96.21 X |
| 3,982,123 | 9/1976 | Goell et al. | 350/96.15 X |
| 3,984,172 | 10/1976 | Miller | 350/96.21 X |

FOREIGN PATENT DOCUMENTS 2627042 12/1977 Fed. Rep. of Germany ........ 350/96.21
1500025 2/1978 United Kingdom .

OTHER PUBLICATIONS

Dabby, "Permanent Multiple Splices of Fused-Silica Fibers", *Bell Syst. Tech. Journal*, vol. 54, No. 2, Feb. 1975, pp. 451–455.

*Primary Examiner*—John K. Corbin
*Assistant Examiner*—John D. Lee
*Attorney, Agent, or Firm*—Fleit & Jacobson

[57] ABSTRACT

An optical fibre terminal block assembly and a method of connecting an optical fibre to a piece of material by pressing the fibre and the material together so that the fibre becomes embedded in the material, the structure so formed being used to provide connectors for connecting optical fibres in accurate alignment.

3 Claims, 12 Drawing Figures

METHOD OF CONNECTING OPTICAL FIBRES

This invention relates to a method of connecting an optical fibre to a piece of material. This invention also relates to the optical fibre when connected to the piece of material.

More specifically, this invention provides a method of connecting an optical fibre to a piece of material, which method comprises pressing the fibre and the material together so that the fibre becomes embedded in the material.

This invention also provides a device comprising an optical fibre so embedded in a piece of material that the material has been deformed around the optical fibre.

In one aspect of the method of the invention, the fibre is laid on a hard surface, for example a glass surface, and then the material is pressed on to the optical fibre.

The material may be any material which is capable of deforming around the optical fibre and retaining this deformation to hold the fibre in position. By way of example, it is mentioned that the material may be aluminium or an aluminium alloy. A presently preferred aluminium alloy is that sold under the trade name DURAL. Some plastics materials may also be used.

The optical fibre may be a plain optical fibre or it may be a coated one. The coating on the optical fibre can be a coating of the type sold under the trade mark KYNAR or a similar material, e.g. a Teflon type of material.

The material in which the optical fibre is embedded may be in the form of a wire and this is often advantageous for enabling the optical fibre to be located in a given position. If desired, the optical fibre may be sandwiched between two pieces of material which deform around the optical fibre. When two pieces of material are employed they may be in the form of plates and, in this case, the plates can be used for joining cables end to end and for generally forming joints and connectors.

Two or more optical fibres may be embedded in one or more pieces of the material. When one or more of the optical fibres are sandwiched between two plates of the material, the resulting construction may be regarded as a terminal block. Male and female terminal blocks may be formed so that they can readily be connected together to automatically align the optical fibre or optical fibres in each block.

Embodiments of the invention will now be described solely by way of example and with reference to the accompanying drawings in which.

Figure 1:
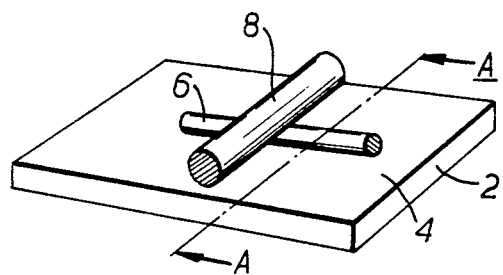
FIGS. 1 to 3 illustrate the method of the invention in joining an optical fibre to an aluminium wire.
Figure 2A:
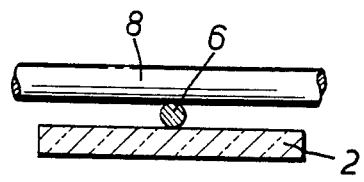
Figure 2B:
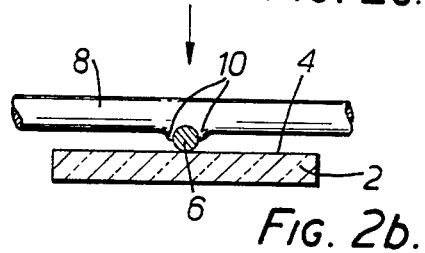
Figure 2C:
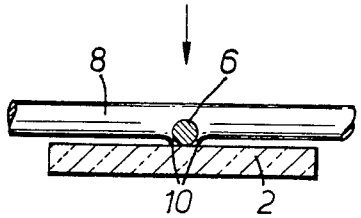
Figure 2D:
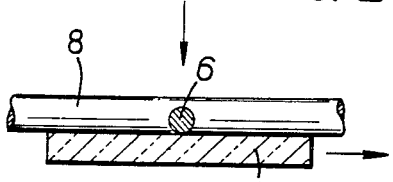
Figure 2E:
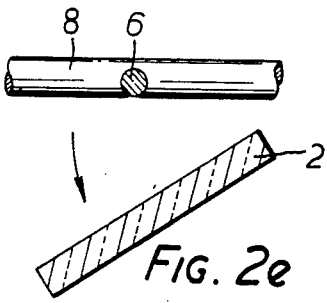
Figure 3:
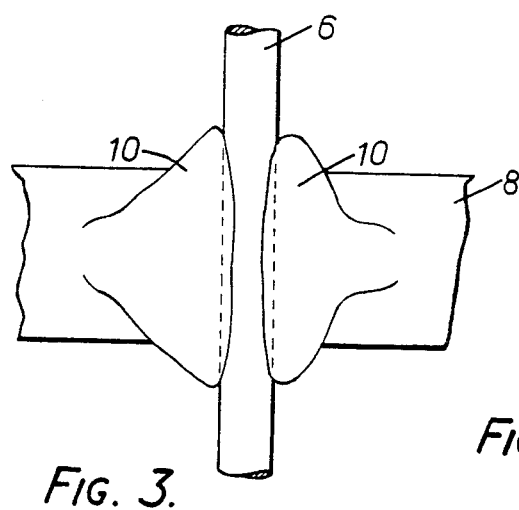

Referring to FIGS. 1 to 3, there is shown a glass plate 2 having a hard surface 4. Positioned on top of the fibre 6 and at right angles to the fibre 6 is an aluminium wire 8.

In FIGS. 2(a)–2(e), there is shown a sequence of operations, the views being taken along the line A—A shown in FIG. 1. FIG. 2(a) shows the fibre 6 and wire 8 in the position shown in FIG. 1. FIG. 2(b) shows the wire 8 as it is being pushed towards the surface 4. The wire 8 is shown peaked at the peaks 10 and these peaks 10 are proceeding to move around the circumference of the fibre 6. In FIG. 2(c) the peaks 10 are shown to have extended quite a long way around the circumference of the fibre 6 and the final position is shown in FIG. 2(d). As shown in FIG. 2(e), the wire 8 has been deformed so far round the fibre 6 that it has passed the middle position of the fibre 6 and has flowed inwardly so that the fibre 6 is firmly embedded in the wire 8. The flowing of the peaks 10 around the fibre 6 is also shown in FIG. 3.

Figure 4A:
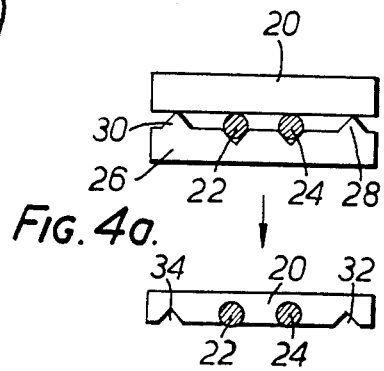
FIGS. 4 and 5 show methods of forming and joining terminal blocks according to the invention.
Figure 4B:
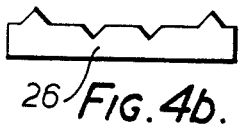

Referring now to FIGS. 4(a) and 4(b) there is shown an aluminium plate 20 and two optical fibres 22, 24. Also shown in FIG. 4 is a tool 26. The tool 26 is provided with two upwardly extending portions 28, 30 which are triangular in cross section and which, as shown in FIG. 4(b) leave two channels 32, 34 which are also triangular in cross section, in the plate 20. As is also shown clearly in 4(b) the fibres 22, 24 have been securely embedded in the plate 20 in the manner illustrated in detail in FIGS. 2(a)–2(e). The fibres are initially positioned either with their ends level with the edge of the plate 20 or with their ends projecting outwardly from the edge of the plate in which case they are subsequently cut level with the edge so that they meet the fibres of the co-operating connecting block (see FIG. 5).

Figure 5:
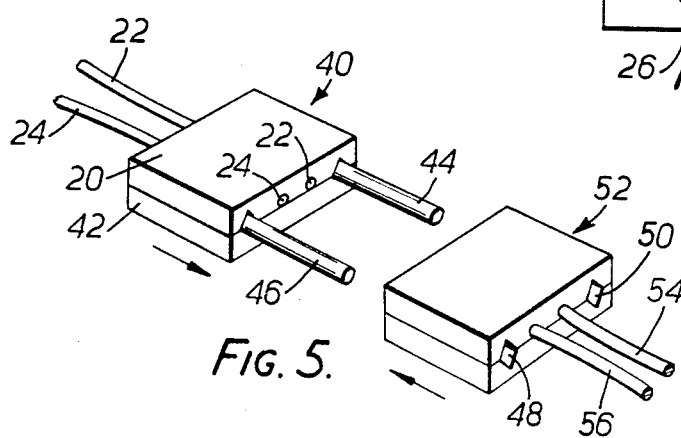

Referring now to FIG. 5, there is shown a terminal block 40. The top of the block 40 is formed by the plate 20 shown in FIGS. 4(a) and 4(b). The bottom of the block 40 is formed by a portion 42 which can be provided with two grooves aligned with the grooves 32, 34 shown in FIG. 4(b). The grooves in the block parts 20, 42 receive rods 44, 46. These rods 44, 46 can be pushed into diamond shaped holes 48, 50 formed in the female block member 52. As shown in FIG. 5, the female block member 52 is also provided with optical fibres 54, 56. When the male block 40 and the female block 52 are pushed together the rods 44, 46 will locate the two blocks together in such a position that the ends of the fibres 22, 24, 54, 56 will be exactly aligned and so that an appropriate connection will have been made.

Figure 6:
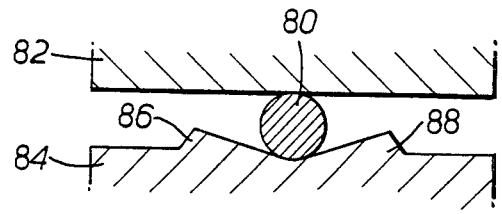
FIG. 6 shows another method of joining an optical fibre to a piece of aluminium.

Referring now to FIG. 6, there is shown an optical fibre 80 sandwiched between an aluminium plate 82 and a tool 84. The tool 84 is provided with upwardly facing projections 86, 88 which are shaped as shown and which assist in holding the fibre 80 in its initial position. The members 86, 88 dig into the aluminium and displace the aluminium around the fibre 80 in order to securely clamp the fibre 80. The projections 86, 88 also ensure that the fibre 80 is fully impressed into the plate 82 so that the fibre 80 is not exposed.

Figure 7:
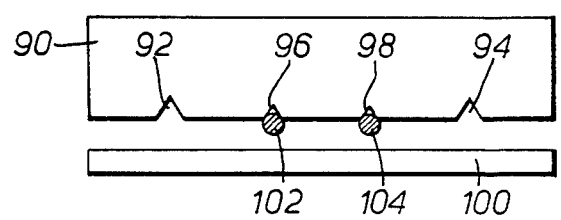
FIG. 7 shows an alternate method of forming and joining terminal blocks to that shown in FIGS. 4 and 5.

The arrangement of FIGS. 4(a), 4(b) is modified in FIG. 7. In FIG. 7 the aluminium block 90 is preformed with two large alignment grooves 92, 94 and with two smaller grooves 96, 98 for reception of the fibres. This enables the pressing tool 100 to be in the simple form of for example, a steel plate which in a preferred embodiment is screwed onto the aluminium block 90, using pre-drilled holes, thus causing the fibres 102, 104 to be impressed into the block 90. The plate 100 can be retained in position with respect to the block 90 and can perform the same function as the block 42 in FIG. 5.

The advantage of this type of arrangement is that the pressing tool may be of a very simple construction.

It is to be appreciated that the embodiments of the invention described above have been given by way of example only and that modifications may be effected. Thus, for example, a material other than aluminium may be used and the aluminium may be in a form other than the wire 8 or the plate 20. Also, the shape of the grooves 32, 34 in the plate 20 could be varied.

What is claimed is:

1. A method of connecting an optical fibre to a piece of deformable material comprising:

positioning an optical fibre between a piece of deformable material and a non-heated tool having projections facing the material; and pressing the tool and the piece of material together so that the projections displace material in such manner that the material surrounds at least the majority of the circumference of the fibre whereby the fibre becomes substantially embedded and retained in the material without additional securing means.

2. A method of connecting an optical fibre as claimed in claim 1 in which said materials is an aluminium alloy.

3. A method of connecting an optical fibre as claimed in claim 1 in which the piece of material is a block preformed with a shallow groove, and in which the fibre is located in said groove prior to said pressing operation.

* * * * *